H. L. GUENTHER.
MACHINE FOR CAPPING AND DOUBLE SEAMING CANS.
APPLICATION FILED JAN. 23, 1911.

1,049,227.

Patented Dec. 31, 1912.
15 SHEETS—SHEET 5.

WITNESSES
Edward Thorpe

INVENTOR
Henry L. Guenther
BY
ATTORNEYS

H. L. GUENTHER.
MACHINE FOR CAPPING AND DOUBLE SEAMING CANS.
APPLICATION FILED JAN. 23, 1911.

1,049,227.

Patented Dec. 31, 1912.

15 SHEETS—SHEET 7.

WITNESSES
Edward Thorpe

INVENTOR
Henry L. Guenther
BY
ATTORNEYS

H. L. GUENTHER.
MACHINE FOR CAPPING AND DOUBLE SEAMING CANS.
APPLICATION FILED JAN. 23, 1911.

1,049,227.

Patented Dec. 31, 1912.
15 SHEETS—SHEET 9.

WITNESSES
Edw. Thorpe

INVENTOR
Henry L. Guenther
BY
ATTORNEYS

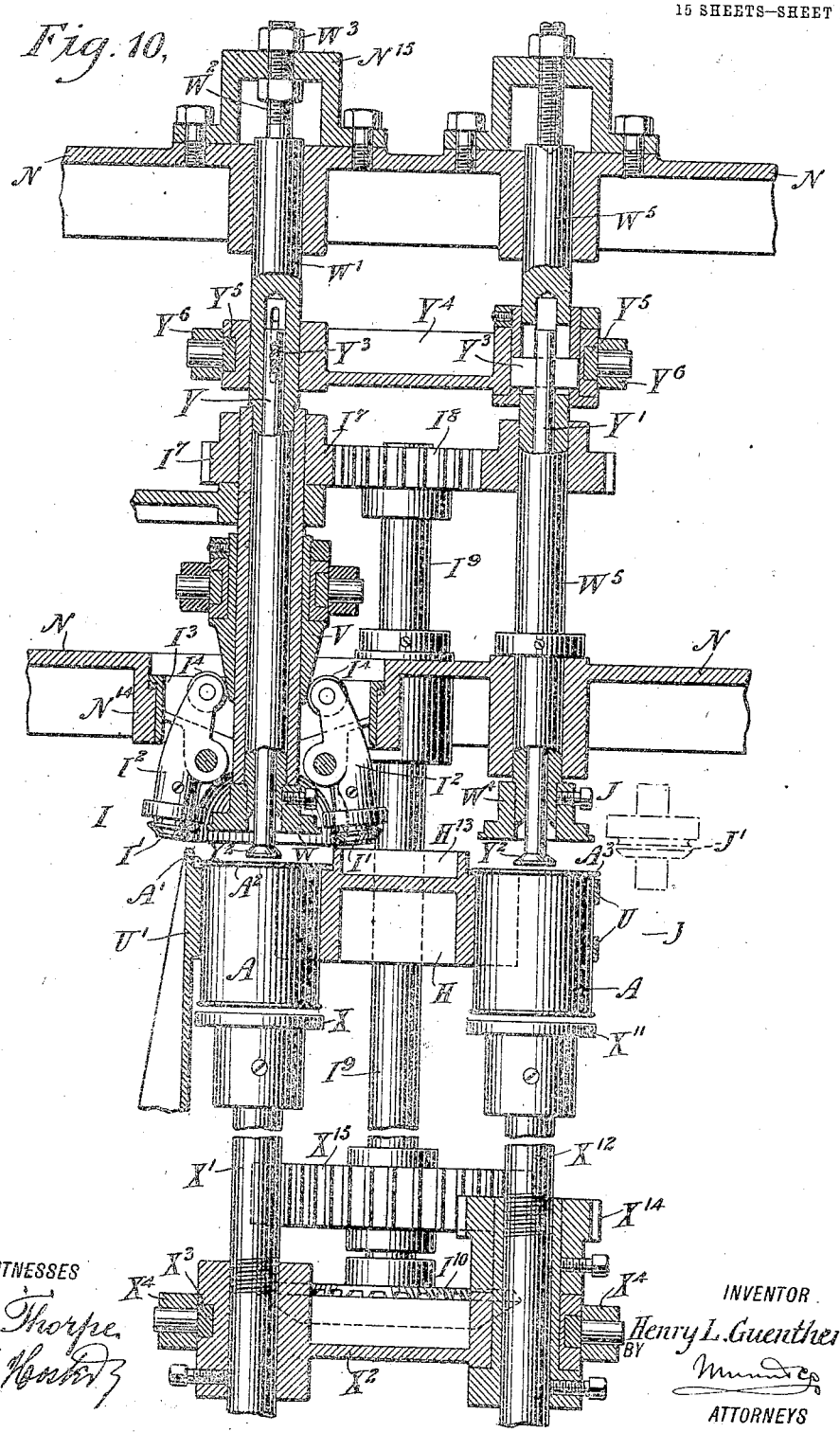

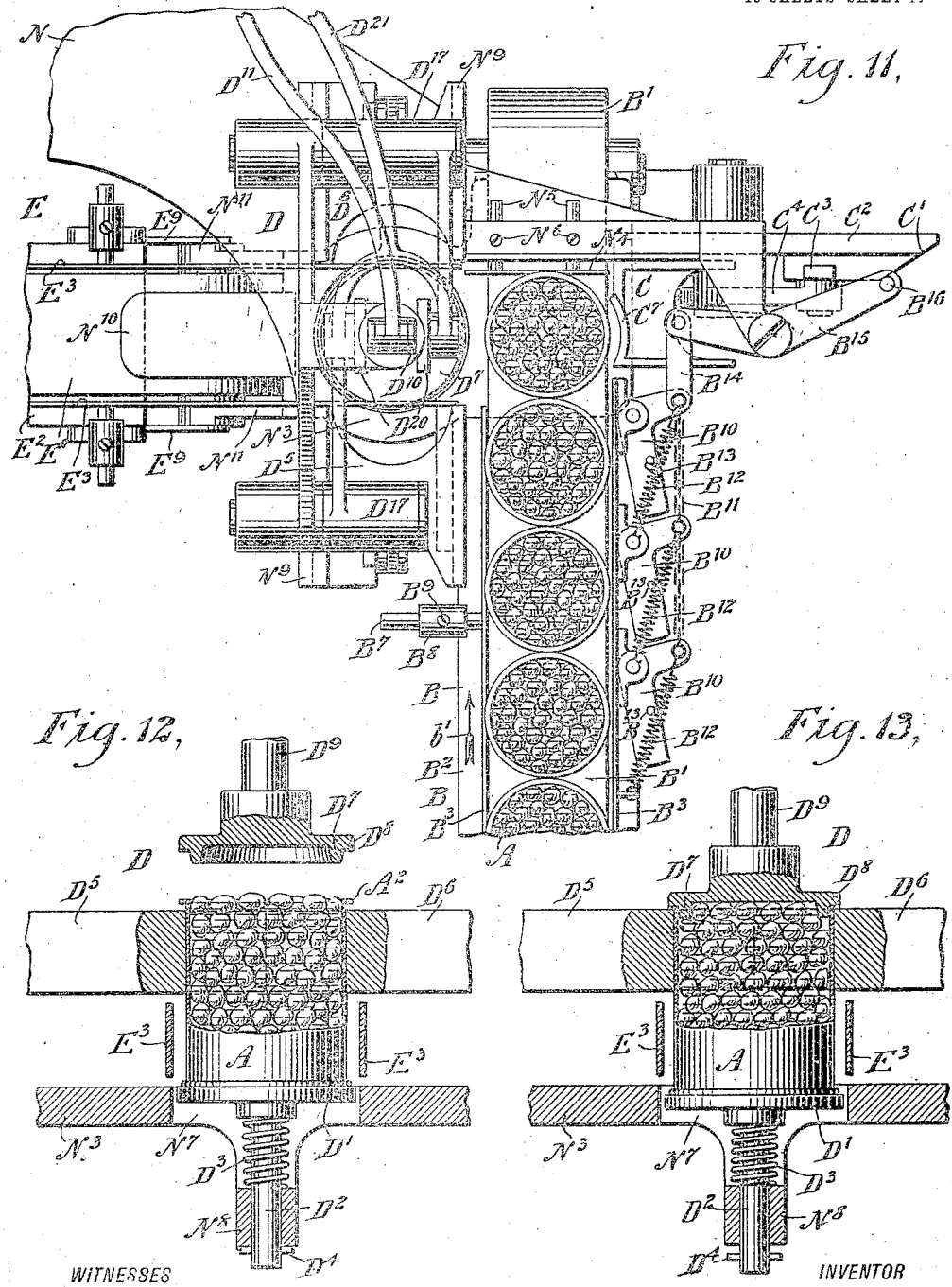

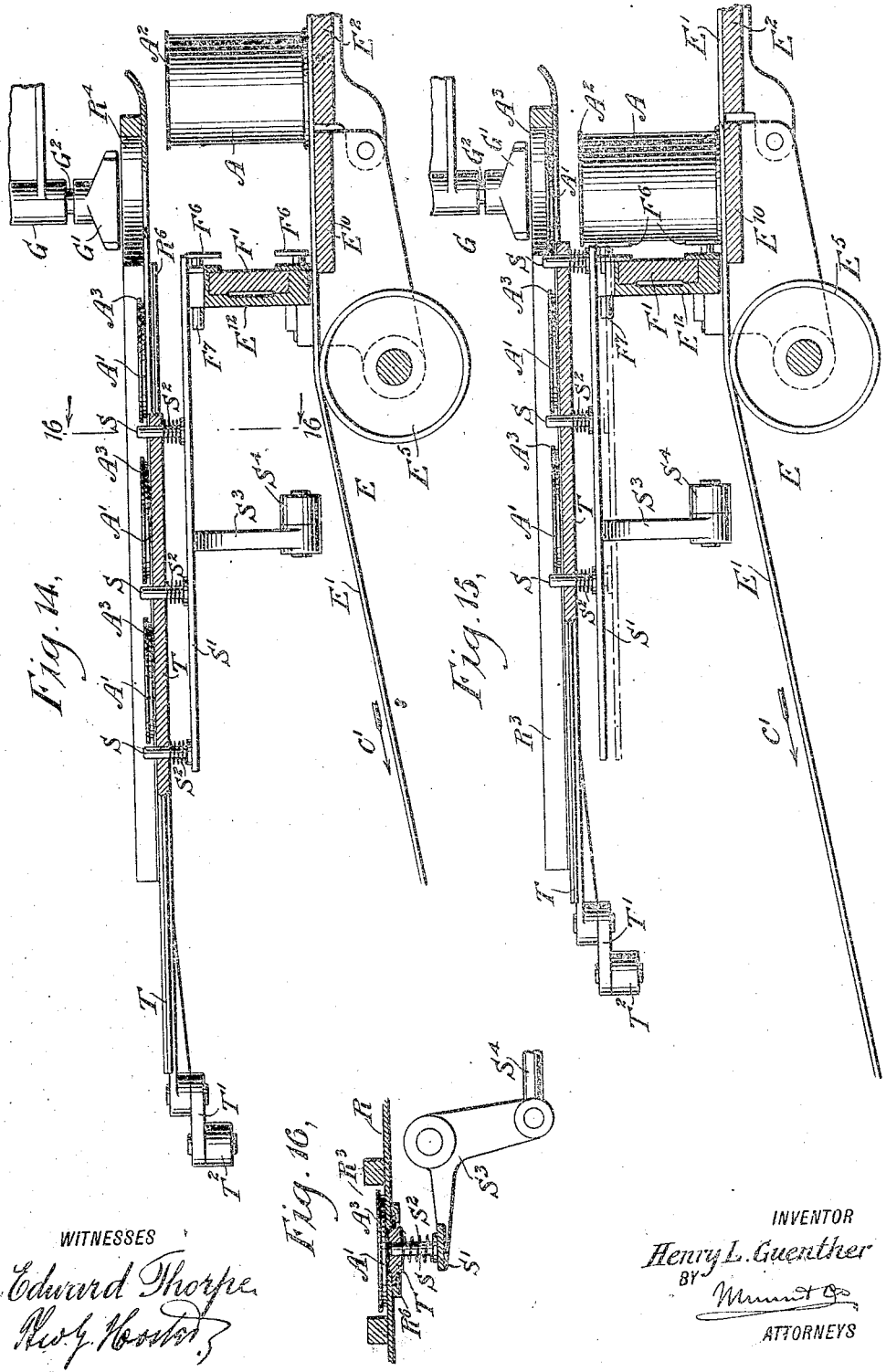

H. L. GUENTHER.
MACHINE FOR CAPPING AND DOUBLE SEAMING CANS.
APPLICATION FILED JAN. 23, 1911.
1,049,227.
Patented Dec. 31, 1912.
15 SHEETS—SHEET 13.
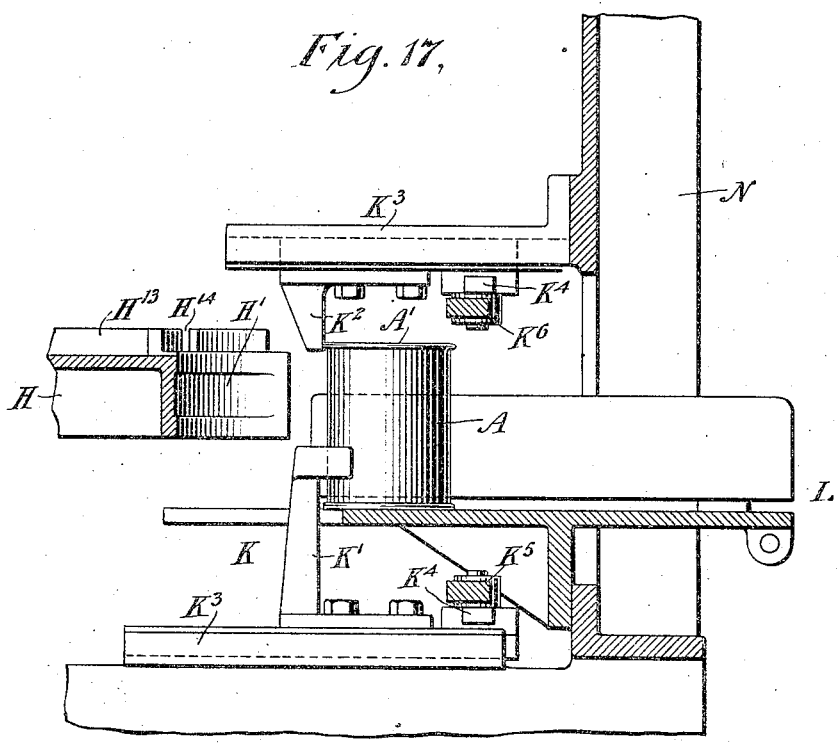
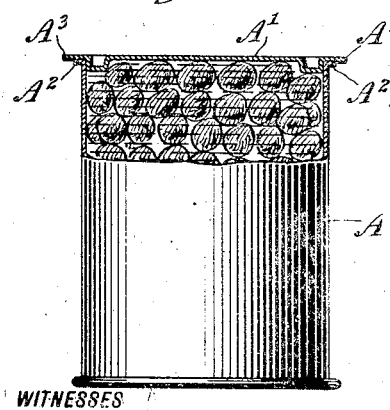
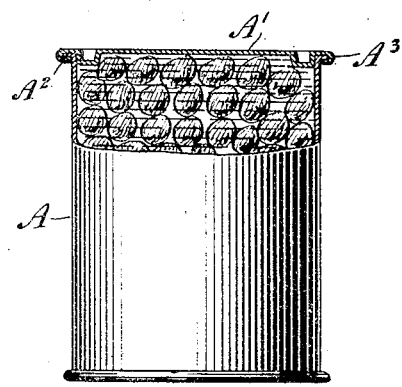
WITNESSES
Edward Thorpe
INVENTOR
Henry L. Guenther
BY
ATTORNEYS

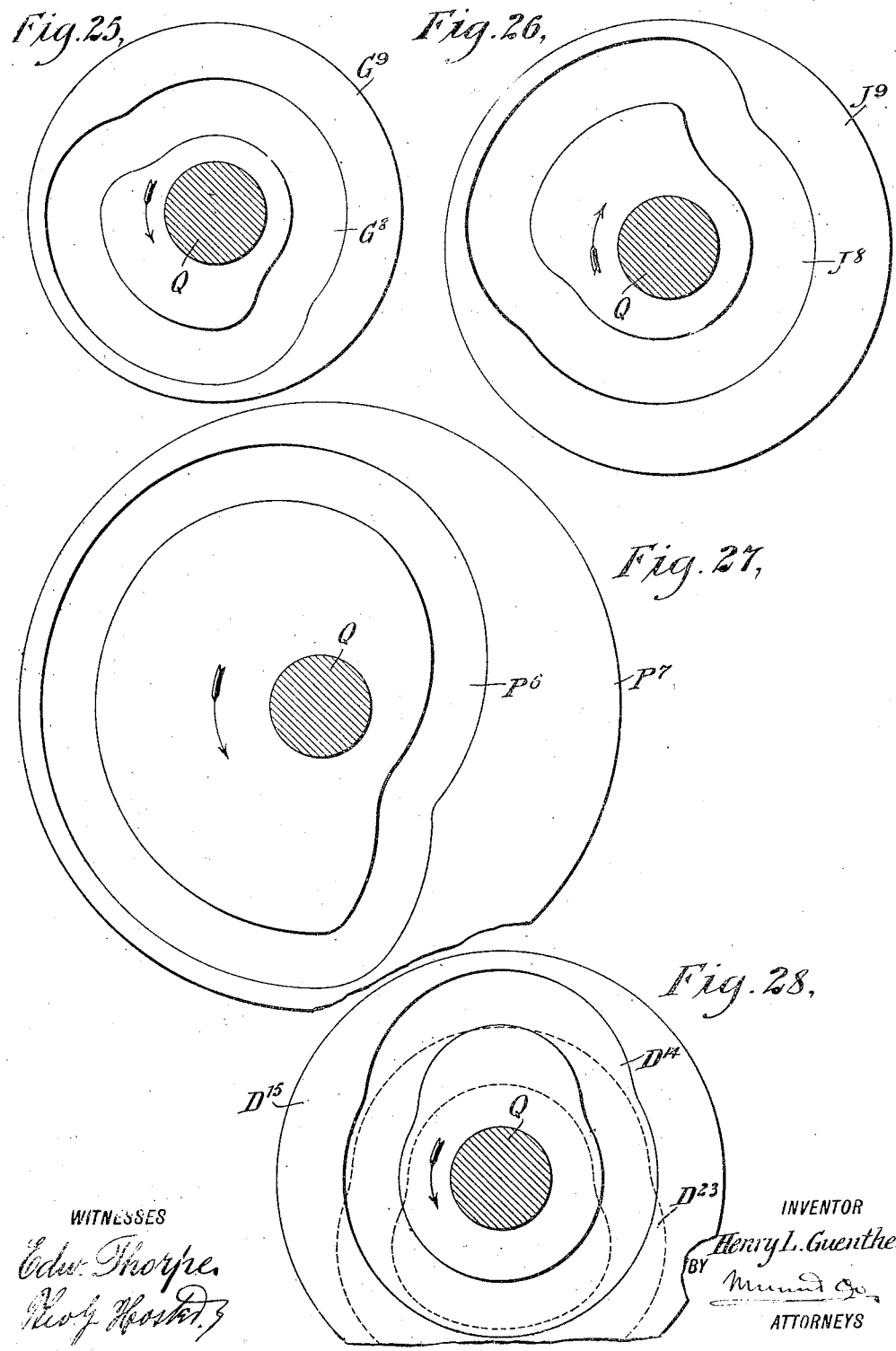

UNITED STATES PATENT OFFICE.

HENRY L. GUENTHER, OF LOS ANGELES, CALIFORNIA.

MACHINE FOR CAPPING AND DOUBLE-SEAMING CANS.

1,049,227.  Specification of Letters Patent.  Patented Dec. 31, 1912.

Application filed January 23, 1911. Serial No. 604,241.

*To all whom it may concern:*

Be it known that I, HENRY L. GUENTHER, a citizen of the United States, and a resident of Los Angeles, in the county of Los Angeles and State of California, have invented a new and Improved Machine for Capping and Double-Seaming Cans, of which the following is a full, clear, and exact description.

The invention relates to a type of special machines employed for double seaming and compressing the heads of cans used in packing fruits and other food products.

The object of the invention is to provide a new and improved machine for capping and double-seaming cans, arranged to restore the mouths of can bodies which have become distorted while being filled or handled, to press the fruits or other food products, that may extend above the edge of the can body, downward into the same, to place the can heads in position on the can bodies and to double-seam the flanges of the can bodies and can heads, and to compress the seams with a view to render the same airtight without the use of solder, and to remove the finished cans from the machine.

The invention consists of the novel features and parts and combinations of the same, which will be fully described hereinafter and pointed out in the claims.

A practical embodiment of the invention is represented in the accompanying drawings forming a part of this specification, in which similar characters of reference indicate corresponding parts in all the views.

Figure 1:
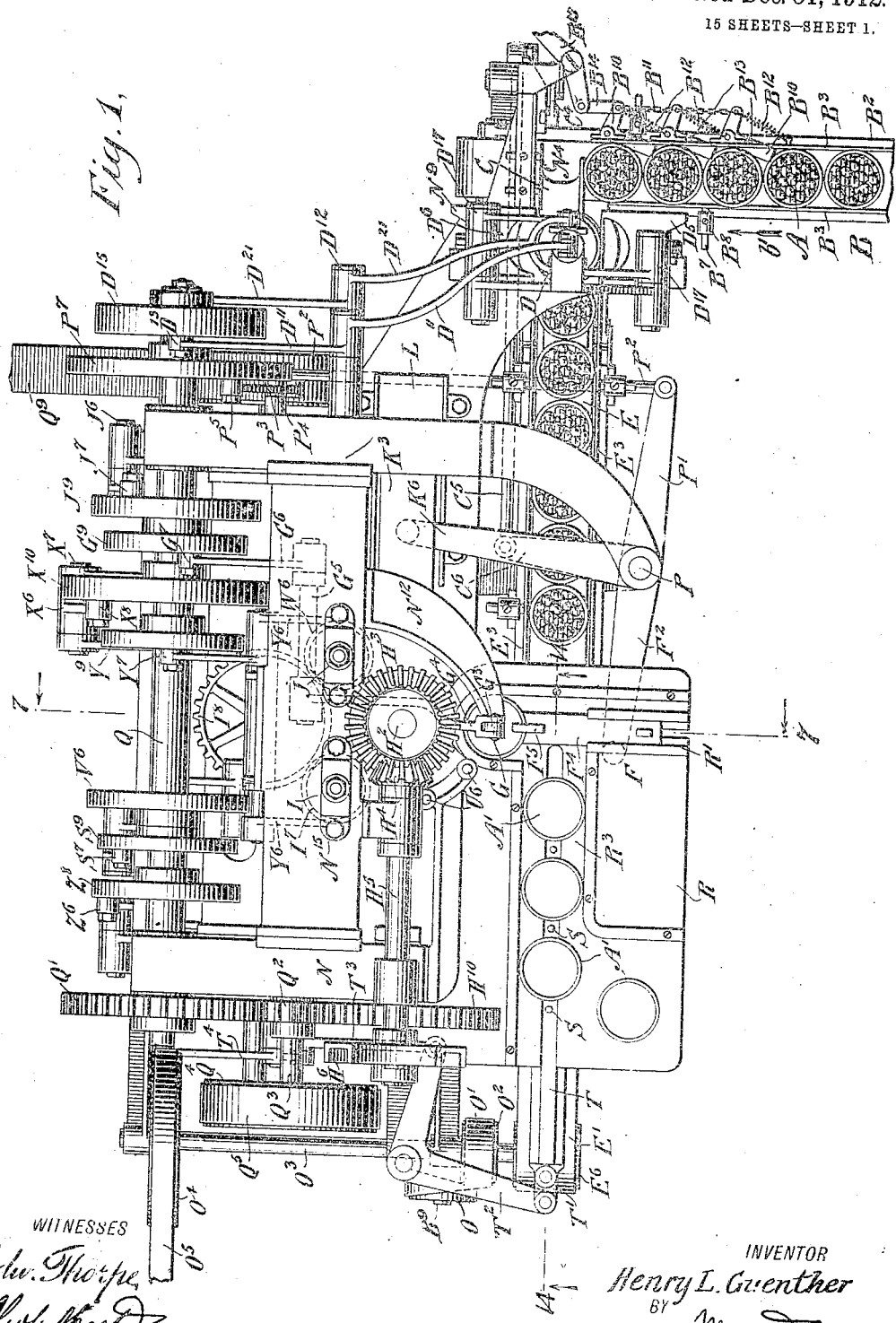
Figure 2:
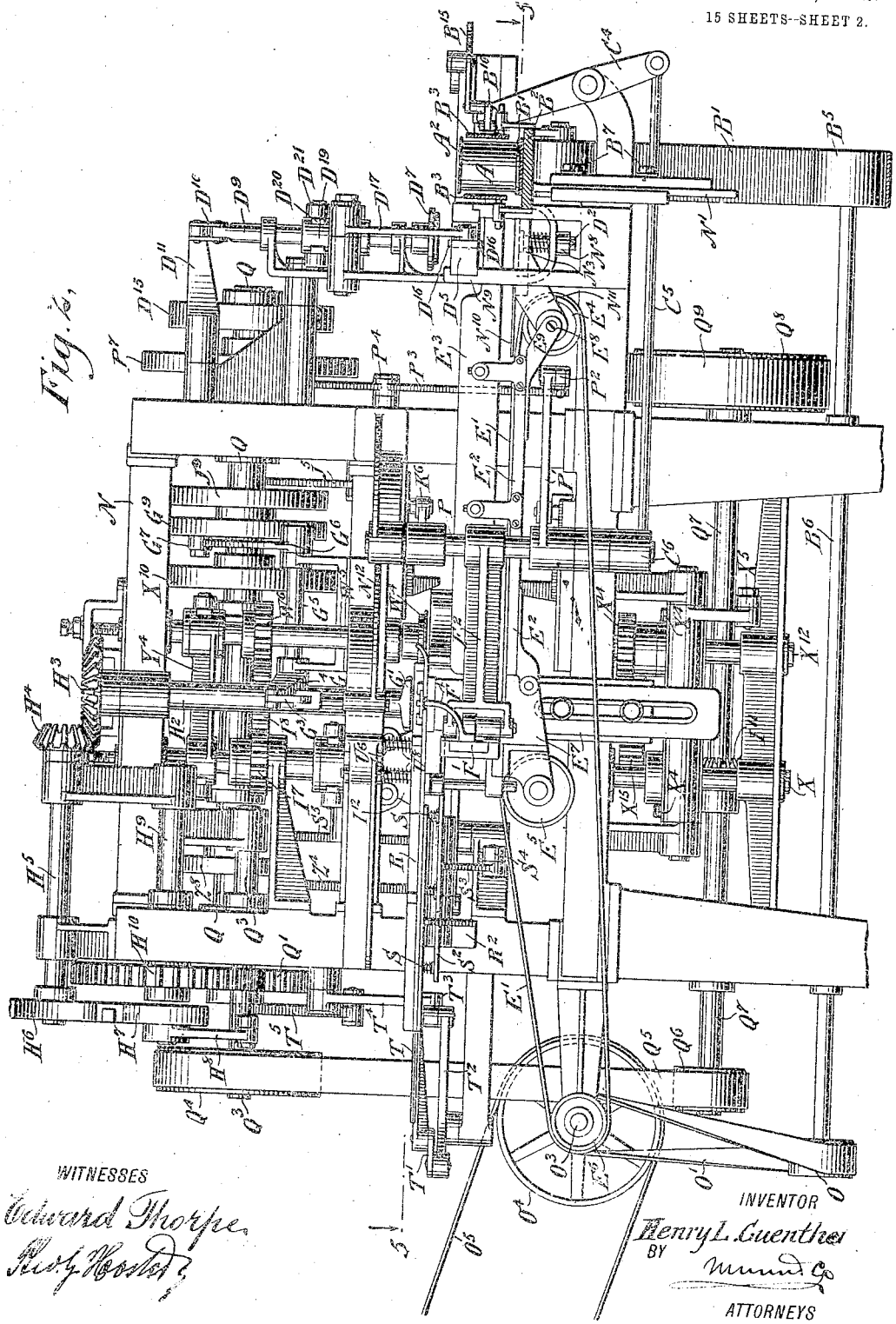
Figure 3:
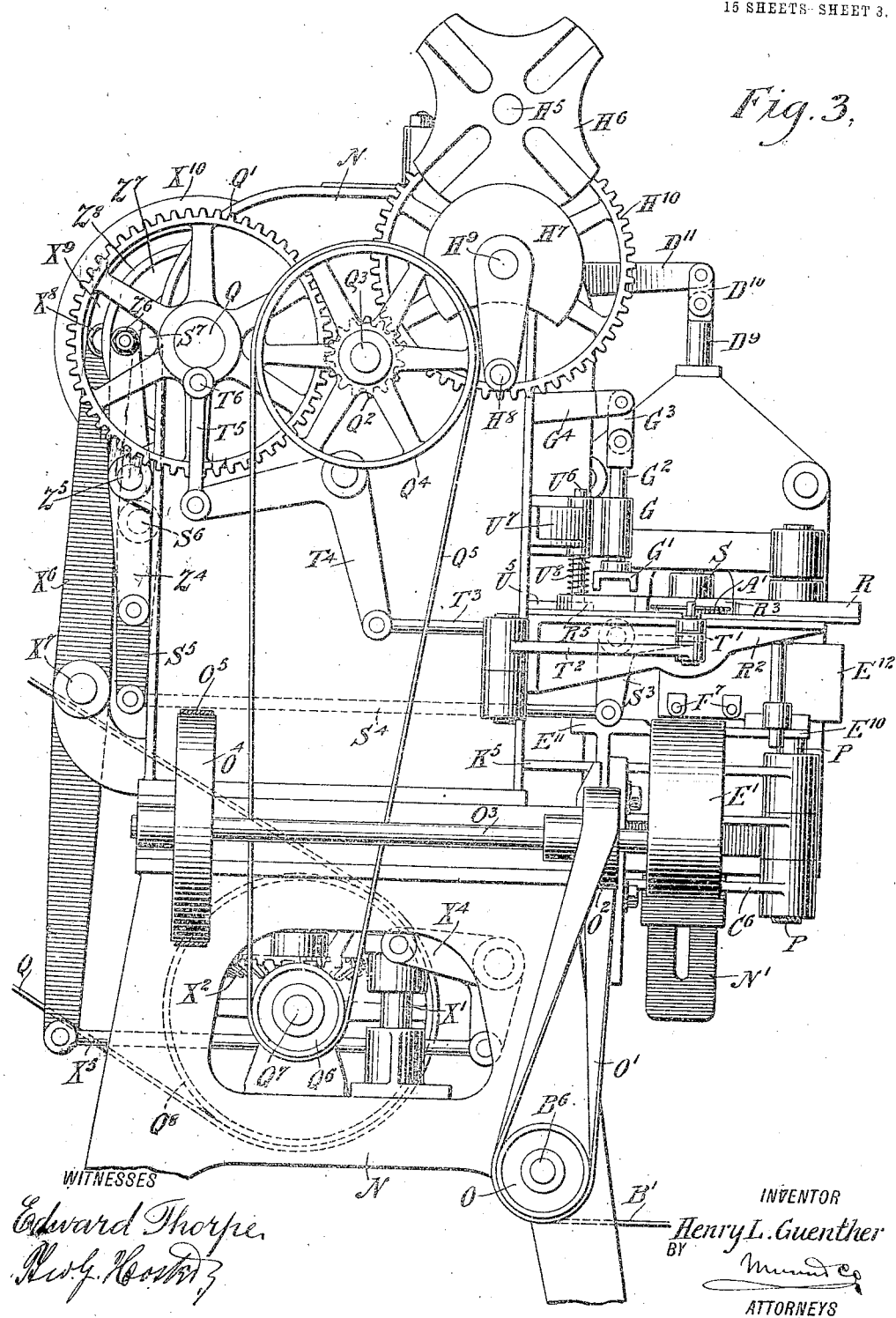
Figure 4:
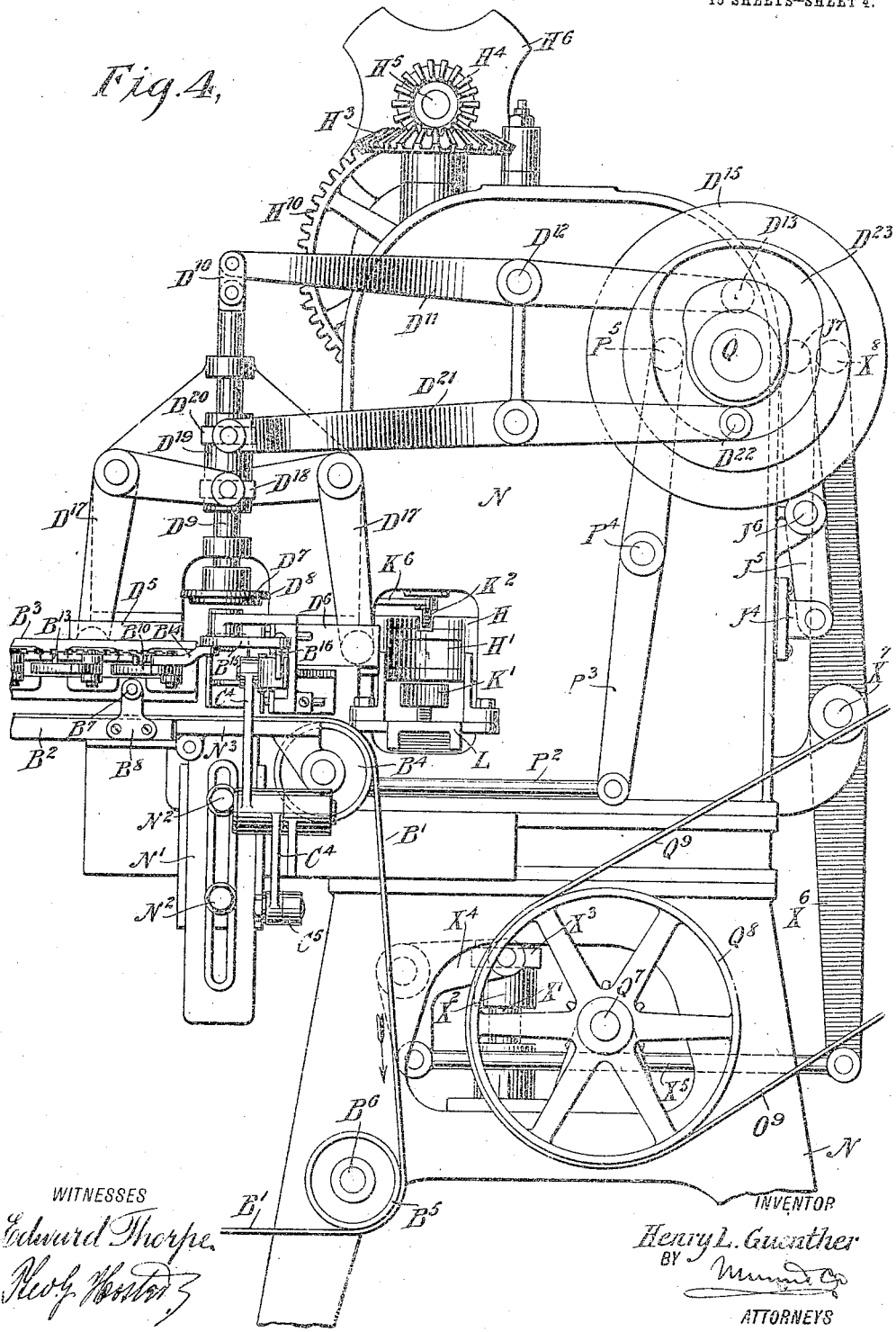
Figure 5:
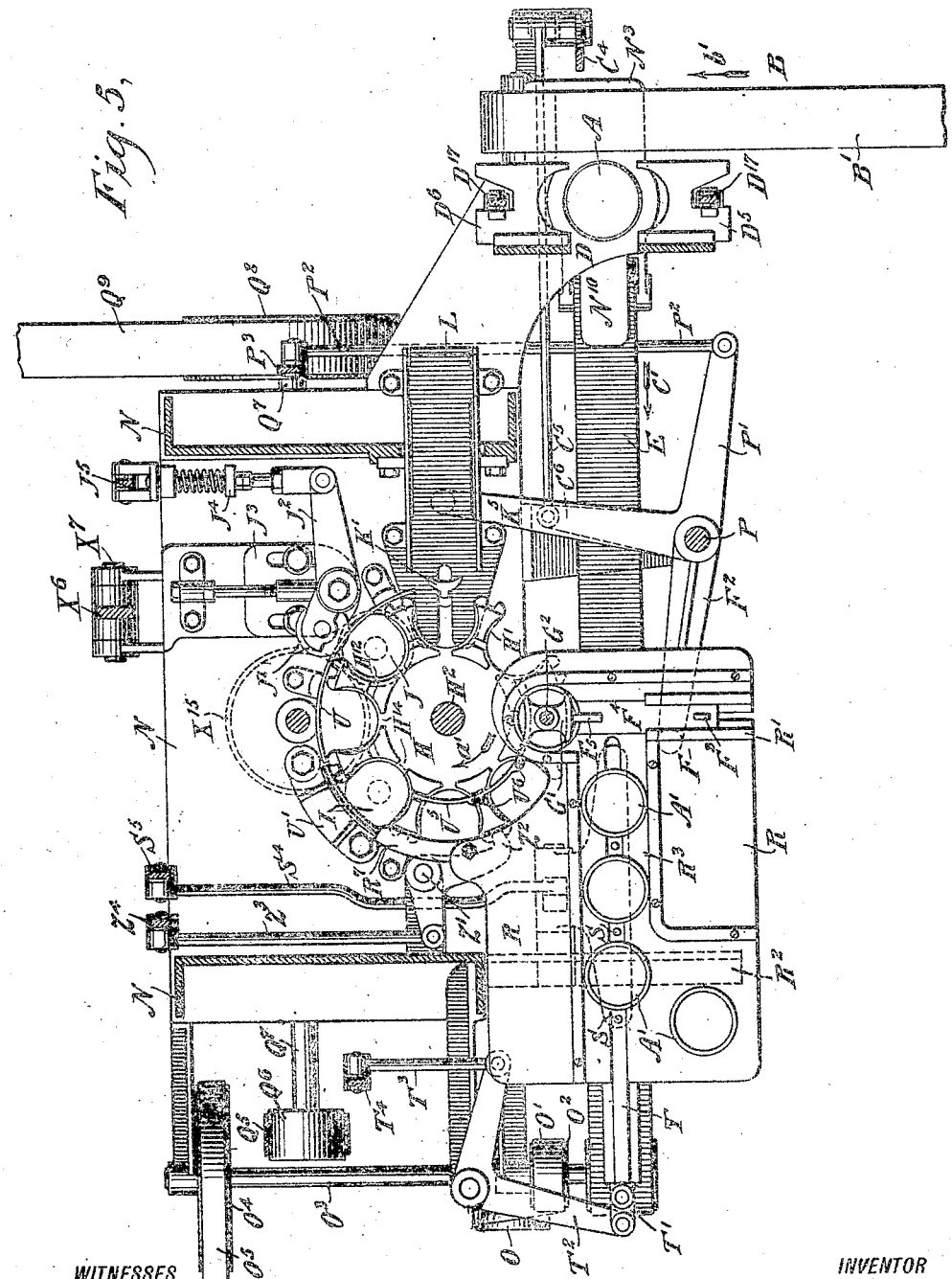
Figure 6:
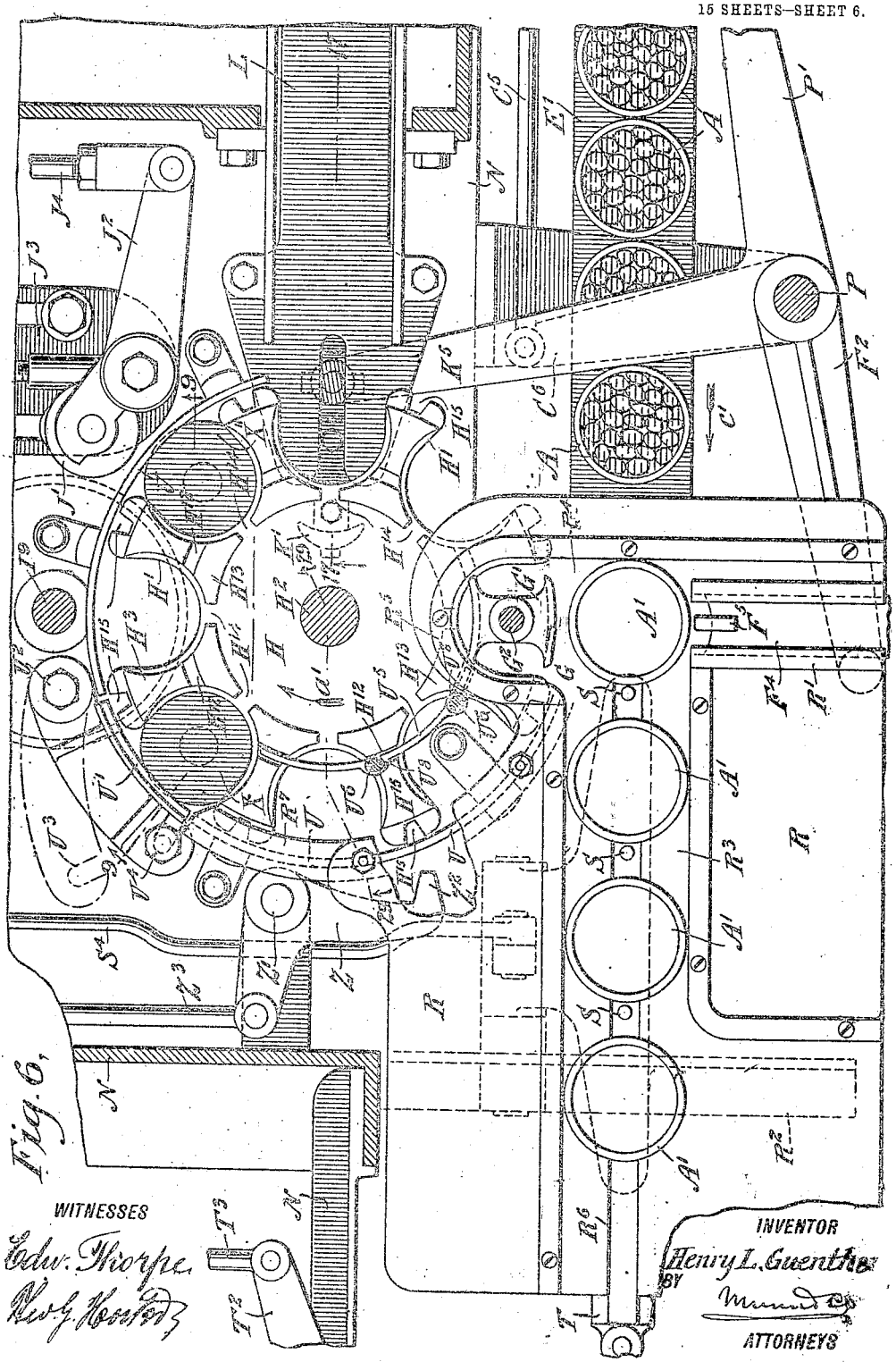
Figure 7:
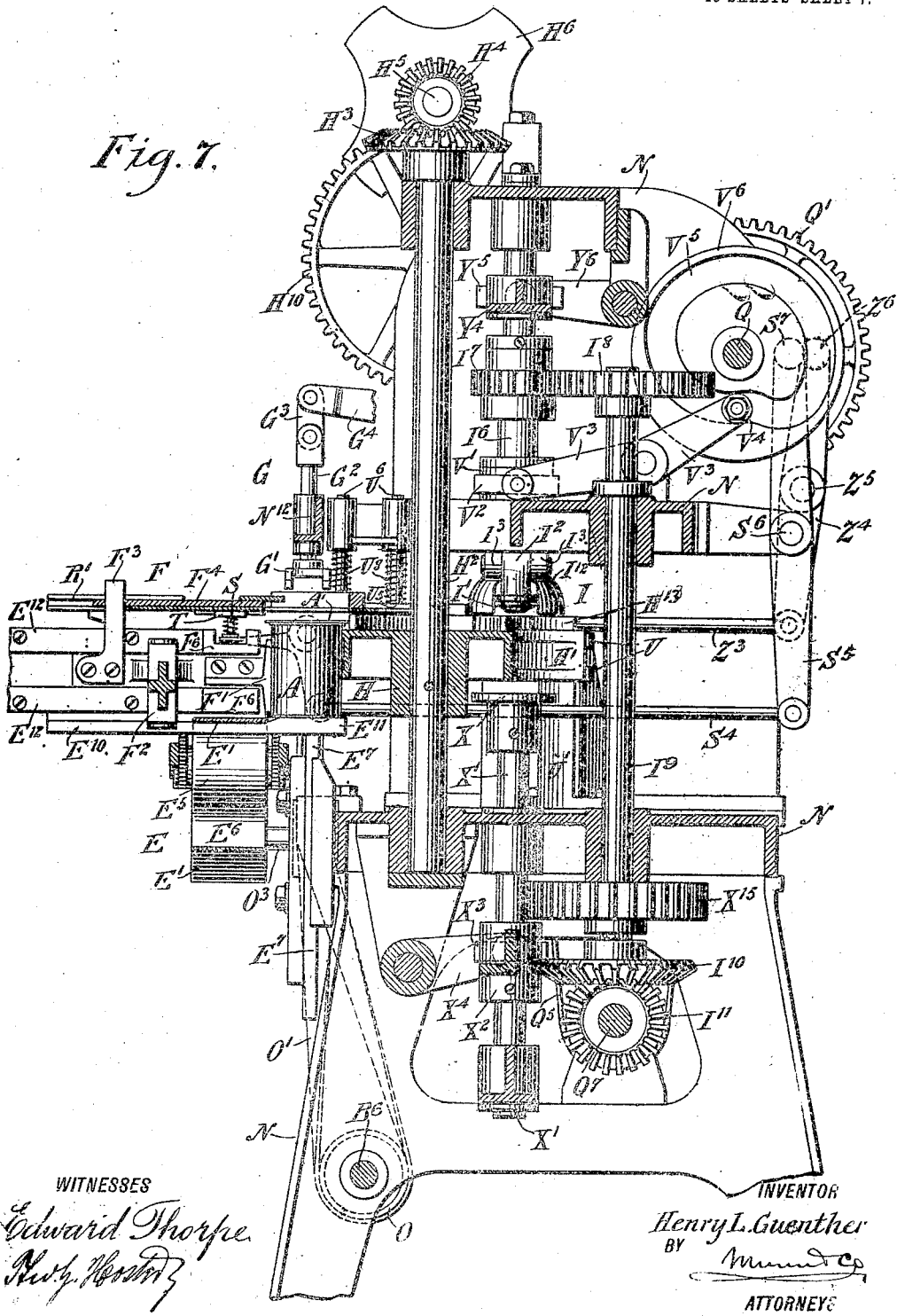
Figure 8:
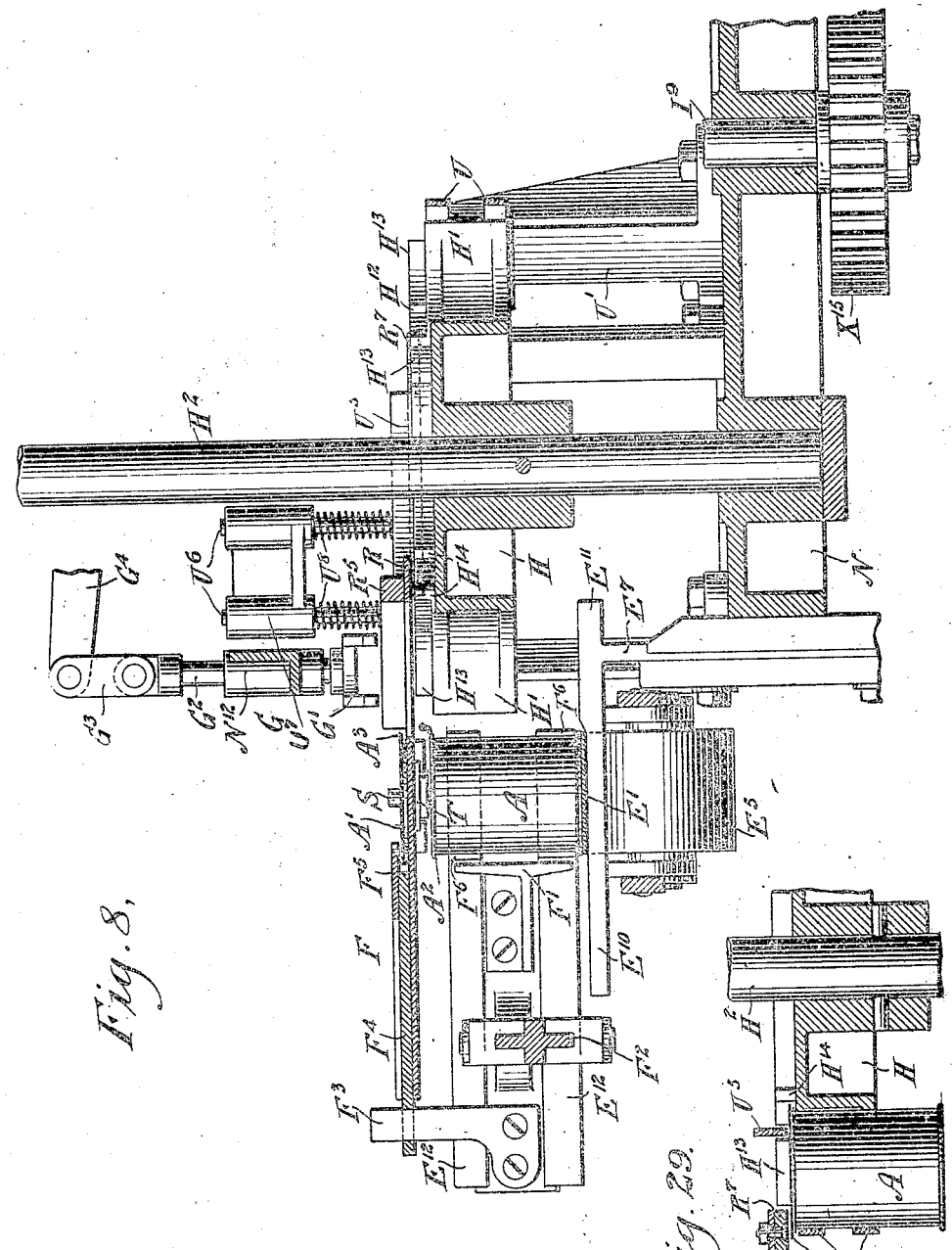
Figure 9:
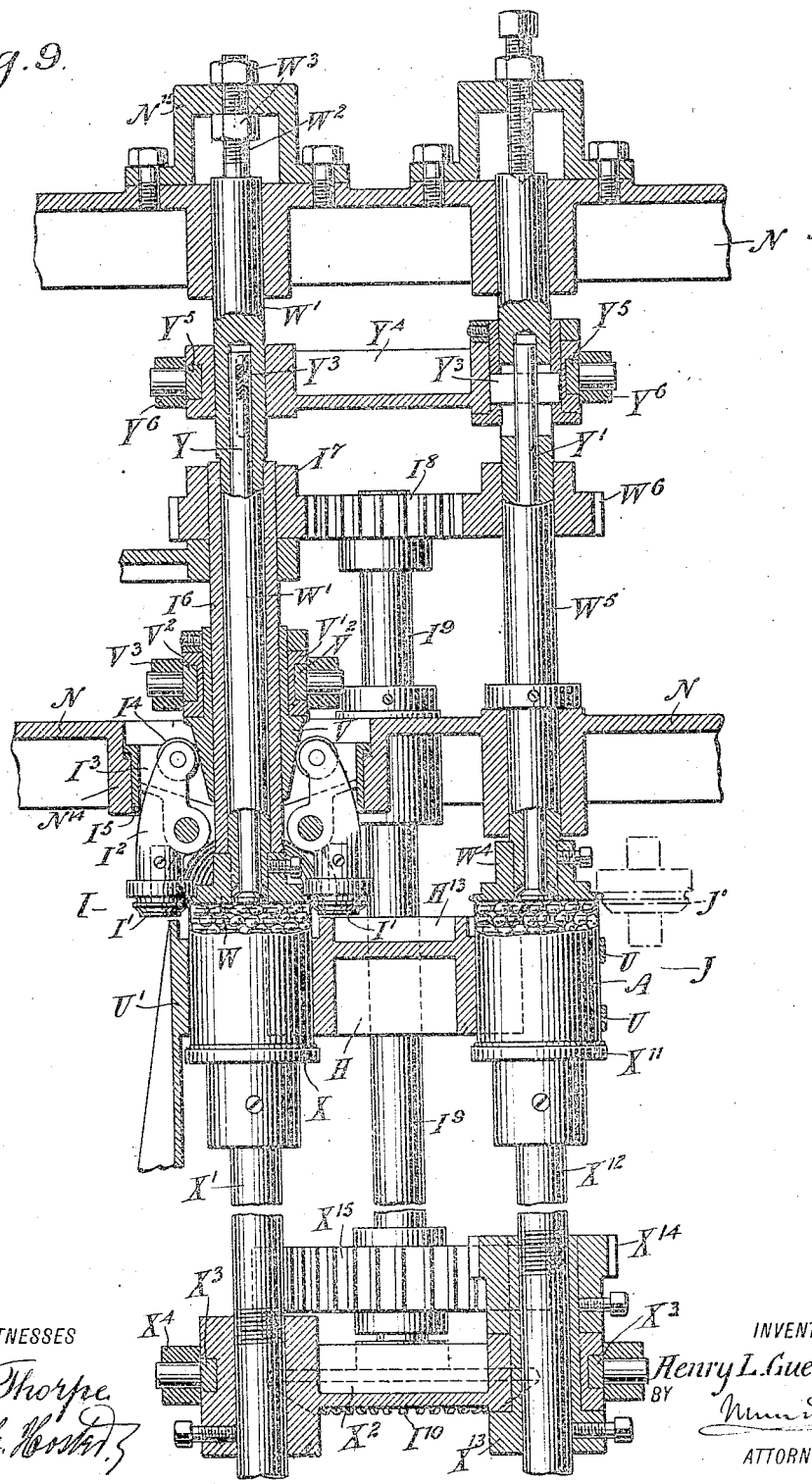
Figure 20:
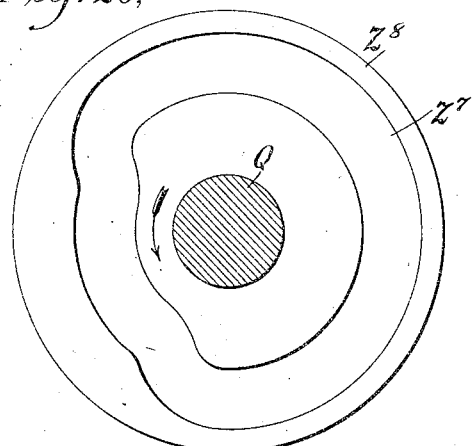
Figure 21:
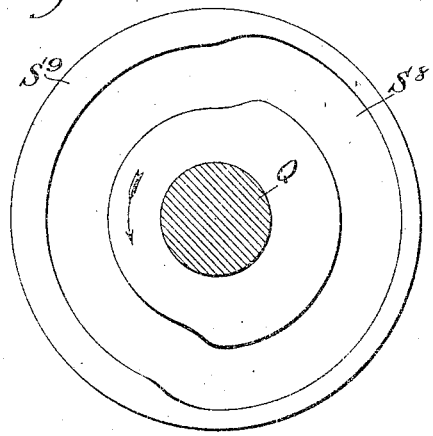
Figure 22:
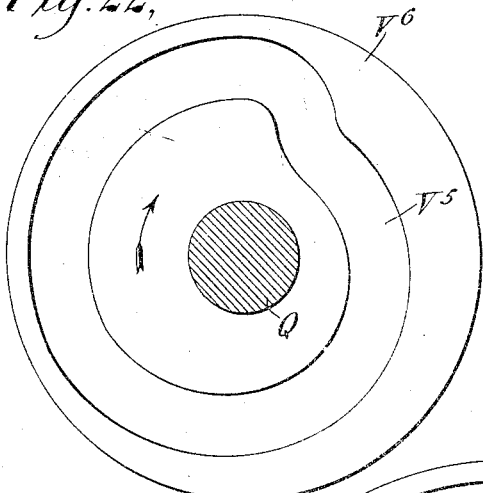
Figure 23:
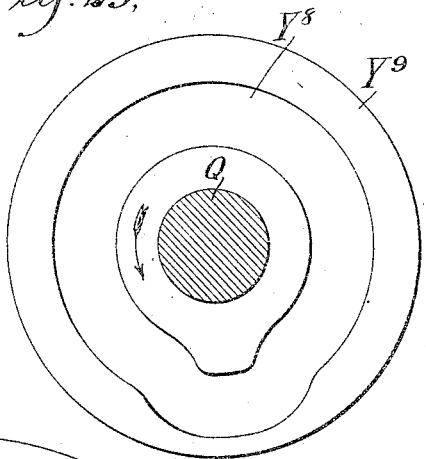
Figure 24:
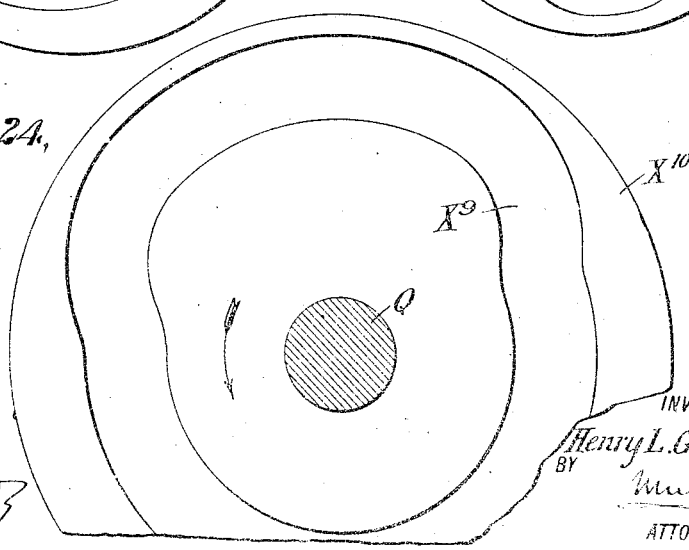

Figure 1 is a plan view of the machine for capping and double-seaming cans; Fig. 2 is a front elevation of the same, the can body conveyer being shown in section; Fig. 3 is an enlarged elevation of the left-hand side of the machine; Fig. 4 is a similar view of the right-hand side of the machine; Fig. 5 is a sectional plan view of the machine on the line 5—5 of Fig. 2; Fig. 6 is an enlarged sectional plan view of the same with the parts in a different position; Fig. 7 is an enlarged transverse section of the machine on the line 7—7 of Fig. 1; Fig. 8 is an enlarged transverse section of the same with the parts in a different position, and showing more particularly the platen, the assembling device and the shifting device for moving the can body and can head into position under the assembling device and into the platen; Fig. 9 is an enlarged sectional side elevation of the double-seaming device and the compressing device, the section being on the line 9—9 of Fig. 6; Fig. 10 is a similar view of the same showing the parts in position after the flange of one can body is double-seamed and compressed; Fig. 11 is an enlarged plan view of the can body conveyer and the pressing and shaping device; Fig. 12 is an enlarged sectional side elevation of a filled can, and the means for pressing the food product down into the can and to restore the distorted mouth of a can body, the plunger being in a raised position; Fig. 13 is a like view of the same and showing the parts lowered in engagement with the can body to restore the distorted mouth of the can body to proper form; Fig. 14 is an enlarged sectional side elevation of the can body and the can head conveyers and assembling device, the section being on the line 14—14 of Fig. 1; Fig. 15 is a like view of the same and showing the parts in a different position; Fig. 16 is a cross section of the same on the line 16—16 of Fig. 14; Fig. 17 is an enlarged sectional side elevation of the ejecting device for removing a finished can from the platen, the section being on the line 17—17 of Fig. 6; Fig. 18 is an enlarged side elevation, partly in section, of a filled can with the can head in position thereon and prior to double-seaming the flanges; Fig. 19 is a like view of the finished can, showing the can head double-seamed and compressed on the can body; Figs. 20 to 28 are face views of the cams on the cam shaft, and employed for imparting movement to sundry of the devices of the machine; and Fig. 29 is a sectional side elevation of part of the platen and the top guides for the can head.

The filled can bodies A are carried by a transversely-arranged conveyer B (see Figs. 1, 2, 4, 5 and 11) to a reciprocating pusher C to move the can bodies A one after another to a pressing and restoring device D (see Figs. 11, 12 and 13), which serves to compress the fruits or other food products down in the can body A and at the same time restore a distorted mouth of a can body A to regular cylindrical form, and then the can body A is moved from the right to the left by a longitudinally-extending conveyer E to a transverse shifting device F, which serves to shift the can body A and the can head A' to an assembling device G for placing the can head A' into position on the open mouth of the can body A, the said shifting device F also moving the can body A with the head A' thereon into one of a series of notches H' of a horizontally-disposed platen H, revolving intermittently in the direction of the arrow $a'$ and carrying the can body A and its head A' successively to a double-seaming device I and a compressing device J (see Fig. 9) for double seaming and compressing the flanges $A^2$, $A^3$ of the can body A and the head A' for hermetically sealing the can, the platen H finally carrying the finished can to an ejecting device K for moving the finished cans off the platen H and over a chute L to the right-hand side of the machine.

The machine is mounted on a suitably constructed frame N, and in detail is constructed as follows: The can body conveyer B (see Figs. 1, 2, 4 and 11) is provided with an endless conveyer belt B', having its upper run passing over a table $B^2$ supporting side rails $B^3$ for holding the can bodies A against sidewise movement while being carried transversely in the direction of the arrow $b'$ by the conveyer belt B'. The conveyer belt B' passes at its rear over pulleys $B^4$, $B^5$ and at the front over pulleys not shown. The pulley $B^4$ is journaled in a bracket N' carrying the rear end of the table $B^2$ and held vertically adjustable on the frame N by bolts $N^2$ extending through a vertical slot in the bracket N', as plainly indicated in Fig. 4. The bracket N' carries a table $N^3$ over which passes the belt B' between the rear end of the table $B^2$ and the pulley $B^4$, and the said table $N^3$ is extended to the left to the pressing and restoring device D and in alinement with the movement of the pusher C. The side rails $B^3$ are provided with sidewise-extending pins $B^7$ slidably engaging brackets $B^8$ attached to the sides of the table $B^2$, so that the side rails can be adjusted toward and from each other to suit can bodies A of different diameters. Screws $B^9$ serve to fasten the pins $B^7$ in place in the brackets $B^8$ after the rails $B^3$ are adjusted. The pulley $B^5$ is the driving pulley for imparting traveling motion to the belt B' in the direction of the arrow $b'$, and the said pulley $B^5$ is secured on a shaft $B^6$ extending longitudinally and journaled in suitable bearings arranged on the frame N. On the left-hand end of the shaft $B^6$ is secured a pulley O connected by a belt O' with a pulley $O^2$ (see Fig. 3), secured on a transversely-extending driving shaft $O^3$ journaled in suitable bearings on the left-hand side of the main frame N. On the shaft $O^3$ is secured a pulley $O^4$ connected by a belt $O^5$ with other machinery for imparting a rotary motion to the shaft $O^3$, which by the pulleys O, $O^2$ and the belt O' imparts a rotary motion to the shaft $B^6$ to cause the pulley $B^5$ to impart a traveling motion to the conveyer belt B'. Through suitable slots in the right-hand rail $B^3$ of the conveyer frame project bell crank levers $B^{10}$ fulcrumed on the right-hand rail $B^3$ and connected with each other by a flexible link $B^{11}$, preferably in the form of a chain, as indicated in Fig. 11. A spring $B^{12}$ connected with each of the bell crank levers $B^{10}$ serves to hold the same normally in an innermost position, as shown in Fig. 1, so that the can bodies A which stand vertically on the upper run of the conveyer belt B' and travel with the same are interrupted in their inward movement and held in position one behind the other until the bell crank levers $B^{10}$ receive a swinging motion in an outward direction (see Fig. 11) to allow the can bodies A to travel forward with the conveyer belt B' until the said bell crank levers $B^{10}$ swing back to the innermost position to again interrupt the forward movement of the can bodies A. The inward movement of each bell crank lever $B^{10}$ is limited by a stop pin $B^{13}$ adapted to abut against the right-hand rail $B^3$. This movement of the bell crank levers $B^{10}$ takes place simultaneously and at such time that a can body can only travel inward from one bell crank lever to the other before its inward movement is interrupted, and this movement of the bell crank levers takes place during each one-eighth revolution of the platen H.

In order to impart the desired movement to the bell crank levers by means of the link $B^{11}$, the innermost bell crank lever $B^{10}$ is pivotally connected by a link $B^{14}$ with a rocking lever $B^{15}$ fulcrumed on the main frame N, and the free end of the said rocking lever $B^{15}$ is provided with a depending pin $B^{16}$ adapted to be engaged by an incline C' formed on an extension $C^2$ of the pusher C employed for shifting the innermost can body A to the pressing and restoring device D. When the pusher C moves from the right to the left to shift the innermost can body A off the conveyer belt B' and into the pressing and restoring device D, then the bell crank levers $B^{10}$ are in active position, as shown in Fig. 1, so as to hold the can bodies against forward movement with the conveyer belt B'. When the pusher C is on the return stroke and moves to the right of the conveyer belt B' then the incline C' acts on the pin $B^{16}$ whereby a swinging motion is given to the lever $B^{15}$ which by the link $B^{14}$ and the chain $B^{11}$ imparts a swinging motion to the bell crank levers $B^{10}$ so that the latter swing outward to the position shown in Fig. 11 and thus release the can bodies A for the latter to travel forward with the conveyer belt B'. The foremost can body A finally moves against a plate $N^4$ to position this forward can body directly opposite the pusher C, as will be readily understood by reference to Fig. 11. The stopping plate N⁴ is provided with transversely-extending pins N⁵ held adjustably in the main frame N and secured therein by set screws N⁶, as shown in Fig. 11. The chain B¹¹ permits independent motion of the bell crank levers B¹⁰, so that the latter readily adjust themselves when in an active position according to the position of the can bodies.

The pusher C is mounted to slide longitudinally in suitable guideways arranged on the main frame N, and in order to impart a reciprocating motion to this pusher, the following arrangement is made: On the front face of the extension C² of the pusher C is mounted to slide vertically a block C³ pivotally connected with the upper end of a lever C⁴ fulcrumed on the main frame N, and the lower end of the said lever C⁴ is pivotally connected by a link C⁵ with an arm C⁶ secured on the lower end of a rock shaft P journaled in suitable bearings arranged on the front of the main frame N. Thus when the shaft P is rocked the arm C⁶, link C⁵, lever C⁴ and block C³ impart a reciprocating motion to the plunger C, so that the latter with its segmental face C⁷ engages the innermost can body A and pushes the same off the conveyer belt B′ into the pressing and restoring device D, after which the plunger C returns to its outermost position. During the outward movement of the plunger C motion is given to the bell crank levers B¹⁰ so that the latter release the can bodies A, as previously described, to allow the can bodies to travel rearward with the conveyer belt B′. The rock shaft P is provided with a sidewise-extending arm P′ pivotally connected by a transverse link P² with the lower end of a lever P³ (see Fig. 4), fulcrumed at P⁴ on the right-hand side of the main frame N, and on the upper end of the lever P³ is journaled a roller P⁵ engaging a cam groove P⁶ in a cam P⁷ (see Fig. 27), secured on a continually-rotating cam shaft Q extending longitudinally and journaled in suitable bearings on the rear upper portion of the main frame N. On the left-hand end of the cam shaft Q is secured a gear wheel Q′ in mesh with a pinion Q² on a shaft Q³ journaled on the main frame N, and on the shaft Q³ is secured a pulley Q⁴ (see Figs. 1 and 3) connected by a belt Q⁵ with a pulley Q⁶ secured on another driving shaft Q⁷ extending longitudinally of and journaled in suitable bearings on the main frame N. On the right-hand end of the shaft Q⁷ (see Fig. 5) is secured a pulley Q⁸ connected by a belt Q⁹ with other machinery for imparting a rotary motion to the shaft Q⁷, which by the belt and gear connection just described imparts a continuous rotary motion to the cam shaft Q. Thus when the cam shaft Q is rotated rocking motion is given by the lever P³, link P² and arm P′ to the rock shaft P, which by the arm C⁶ and link C⁵ imparts a rocking motion to the lever C⁴ to actuate the plunger C for the purpose previously mentioned.

The can body A after being pushed from the conveyer belt B′ passes over the table N³ onto a platform D′ movable in an aperture N⁷ of the table N³ (see Figs. 12 and 13), and the said platform D′ is provided with a downwardly-extending stem D² mounted to slide in bearings N⁸ held on the under side of the table N³. A spring D³ is coiled on the stem D² and rests with its lower end on the bearing N⁸ and presses with its upper end the platform D′ so as to hold the latter normally in an uppermost position, that is, with the top of the platform D′ flush with the table N³, as indicated in Fig. 12, the upward movement of the platform D′ being limited by a stop pin D⁴ held in the lower end of the stem D² and abutting against the under side of the bearing N⁸. By the arrangement described the platform D′ is yieldingly mounted. The can body A while on the platform D′ is engaged exteriorly near its upper end by oppositely disposed dies D⁵, D⁶, mounted to slide transversely in suitable bearings N⁹ (see Fig. 5) arranged on the main frame N, and the said dies D⁵, D⁶ have segmental faces to encircle the upper portion of the can body A. A conical head D⁷ having a vertical reciprocating motion is adapted to pass into the open mouth of the can body A at the time the dies D⁵, D⁶ encircle the can body, so that the head D⁷ presses the food product that may extend above the edge of the can body downward into the can and at the same time the conical head D⁷ by engaging the inner face of the mouth of the can body forces the mouth of the can body in firm contact with the faces of the dies D⁵, D⁶, so that in case the mouth of the can body is distorted it is restored to its regular cylindrical shape. The conical head D⁷ is provided with an annular flange D⁸ adapted to engage the flange A² of the can body A so as to limit the downward movement of the conical head D⁷, at the same time pressing the can body A downward against the tension of the spring D³ until the flange A² of the can body A rests on top of the dies D⁵, D⁶, and straightening the flange that may have been distorted (see for comparison Figs. 12 and 13). After the food product has been pressed downward in the can body A and the distorted mouth of the can body has been restored to regular shape, then the head D⁷ rises and the dies D⁵, D⁶ slide in opposite directions away from each other to completely release the can body A which returns with the platform D′ to the position shown in Fig. 12, so that the next can body pushed over by the plunger C moves the first can body A over the table $N^3$ and over an extension $N^{10}$ thereof onto the conveyer E which carries the can body from the right to the left to the transverse shifting device F.

In order to impart the necessary motion to the conical head $D^7$ the following arrangement is made: The head $D^7$ is provided with an upwardly-extending stem $D^9$ mounted to slide in suitable bearings arranged on the main frame N, and the upper end of the said stem $D^9$ is pivotally connected by a link $D^{10}$ with a transverse lever $D^{11}$ fulcrumed at $D^{12}$ on the right-hand side of the main frame N. The rear end of the lever $D^{11}$ is provided with a friction roller $D^{13}$ engaging a cam groove $D^{14}$ formed on one face of a cam $D^{15}$ (Fig. 28) secured on the cam shaft Q. When the cam shaft Q is rotated the cam $D^{15}$ imparts an intermittent rocking motion to the lever $D^{11}$ whereby an intermittent up and down movement is given to the conical head $D^7$ for the purpose previously mentioned.

In order to impart a transverse sliding movement to the dies $D^5$, $D^6$ the following arrangement is made: The dies are provided with vertical sliding blocks $D^{16}$ (see Fig. 2) pivotally connected with bell crank levers $D^{17}$ fulcrumed on the main frame N (see Fig. 4), and pivotally connected with blocks $D^{18}$ mounted to slide transversely in a sleeve $D^{19}$ mounted to slide up and down on the stem $D^9$, and on the sleeve $D^{19}$ is mounted to slide transversely a block $D^{20}$ pivotally connected with a transverse lever $D^{21}$ fulcrumed on the main frame N, and carrying at its rear end a friction roller $D^{22}$ engaging a cam groove $D^{23}$ formed on the cam $D^{15}$, on the face opposite the one having the cam groove $D^{14}$ (see Figs. 4 and 28). Thus when the cam shaft Q is rotated an intermittent swinging motion is given to the lever $D^{21}$ whereby the sleeve $D^{19}$ is caused to move up and down on the stem $D^9$ so that an intermittent rocking motion is given to the bell crank levers $D^{17}$, to slide the dies $D^5$, $D^6$ intermittently toward and from each other for the purpose previously mentioned. Thus from the foregoing it will be seen that the dies $D^5$, $D^6$ and the conical head $D^7$ co-act to produce the desired result, that is, to press the food products that may extend above the edges of the cans downward into the cans and at the same time restore a distorted can to regular shape.

The conveyer E consists of an endless conveyer belt $E'$ passing over a table $E^2$ supporting rails $E^3$, adjustable similarly to the rails $B^3$ so that a further description of the same is not deemed necessary, and the said conveyer belt $E'$ passes over pulleys $E^4$, $E^5$ and $E^6$, of which the pulley $E^4$ is journaled on the right-hand of the table $E^2$, the pulley $E^5$ is journaled on a bracket $E^7$, and the pulley $E^6$ is secured on the shaft $O^3$, so that when the machine is running a traveling motion is given to the belt $E'$ in the direction of the arrow $c'$. The bracket $E^7$ is held vertically adjustable on the main frame N in the same manner as the bracket $N'$, and the bracket $E^7$ carries the left-hand end of the table $E^2$, the right-hand end of which is supported from the table $N^3$ by brackets $N^{11}$, in which is journaled the shaft $E^8$ of the pulley $E^4$ (see Figs. 2 and 11), and the shaft $E^8$ is also journaled in brackets $E^9$ forming part of the right-hand end of the table $E^2$.

The bracket $E^7$ supports a table $E^{10}$ (see Figs. 7 and 8), which forms a continuation of the table $E^2$ and is extended transversely beyond the side edges of the belt $E'$, as plainly shown in the said figures, said table being slightly raised at the rear to form a seat $E^{11}$ for supporting the can body A after the same has been pushed off the belt $E'$ by the transverse shifting device F. The seat $E^{11}$ is directly below the assembling device G and one of the notches $H'$ of the platen H.

The shifting device F is provided with a pusher $F'$ adapted to engage the front of the can body A to push the same rearwardly off the belt $E'$ and onto the seat $E^{11}$, as shown in Fig. 7, and the said pusher $F'$ is mounted to slide transversely in a guideway $E^{12}$ arranged on the bracket $E^7$ (see Figs. 7, 8, 14 and 15). The pusher $F'$ is pivotally connected with the free end of an arm $F^2$ attached to the rock shaft P previously mentioned, so that when the machine is running, a transverse reciprocating motion is given to the pusher $F'$.

On the pusher $F'$ is secured an upwardly-extending arm $F^3$ engaging a pusher $F^4$ for shifting the can head $A'$ simultaneously with the can body A to assembling position under the assembling device G. The can head pusher $F^4$ is mounted to slide transversely in a guideway $R'$ formed on top of a table R (see Fig. 1) supported on a bracket $R^2$ attached to the main frame N. The table R is provided with a longitudinal guideway $R^3$ for the can heads to pass from the left to the right, one behind the other, to finally pass successively into the path of the pusher $F^4$ which pushes the can head transversely in a guideway $R^4$ formed on top of the table R, the rear end of the guideway $R^4$ forming a stop $R^5$ for limiting the inward movement of the can head $A'$. The bottom of the inner portion of the guideway $R^4$ is apertured to allow the can head $A'$ to drop down into the mouth of the can body A held underneath and supported on the seat $E^{11}$ (see Fig. 7).

The can heads $A'$ are fed from the left to the right by a can head feeding device, consisting essentially of a series of pins S spaced apart and mounted to slide up and down in a slide T mounted to slide longitudinally in a guideway $R^6$ arranged on the table R, as plainly indicated in Figs. 1, 14, 15 and 16. The pins S rest with their lower ends on a longitudinally-extending bar S' and are pressed in contact with the said bar by springs $S^2$ coiled on the pins S and abutting against the under side of the slide T. The bar S' is attached to a bell crank lever $S^3$ fulcrumed on the bracket $R^2$ and pivotally connected by a transversely-extending link $S^4$ with a lever $S^5$ (see Fig. 3), fulcrumed at $S^6$ on the rear of the main frame N, and on the upper end of the said lever $S^5$ is arranged a friction roller $S^7$ (see Figs. 1 and 3) engaging a cam groove $S^8$ formed in the face of a cam $S^9$ (see Fig. 21) attached to the cam shaft Q. Thus when the machine is running the cam $S^9$ imparts an intermittent rocking motion to the lever $S^5$ which by the link $S^4$, bell crank lever $S^3$ and its bar S' periodically moves the pins S up and down. When the pins S are up and project above the slide T and the latter is moved from the left to the right then the can heads A' are carried along in the guideway $R^3$, the foremost can head being finally pushed into the path of the pusher $F^4$. When the pins S are moved downward to the position shown in Fig. 16 then the slide T is moved from the right to the left and hence the pins do not act on the can heads A', which now remain stationary in the guideway $R^3$ for the time being. When the slide T reaches the end of its outer stroke the pins S are again raised to carry the can heads A' from the left to the right at the next operation.

The left-hand end of the slide T is pivotally connected by a link T' with a bell crank lever $T^2$ fulcrumed on the left-hand end of the main frame N, and the said bell crank lever $T^2$ is pivotally connected by a link $T^3$ with a second bell crank lever $T^4$ likewise fulcrumed on the left-hand end of the main frame N (see Fig. 3), and the bell crank lever $T^4$ is pivotally connected by a link $T^5$ with a wrist pin $T^6$ secured on the gear wheel Q', so that when the machine is running a reciprocating motion is given by the mechanism described to the slide T for carrying the pins S from the left to the right at the time the pins are raised, and for carrying the pins S from the right to the left at the time the pins S are in their lowermost position.

The pusher $F^4$ is provided on top with an over-hang $F^5$ adapted to engage the top of the can head A' to prevent the can head from accidental upward movement during the time the pusher $F^4$ pushes the can head along the guideway $R^4$ until the can head A' drops through the perforated rear portion of the bottom of the guideway $R^4$ onto the can body A.

The can bodies A carried from the right to the left by the conveyer belt E' abut against the stops $F^6$ at the time the can body reaches the table $E^{10}$. The stops $F^6$ are provided with pins $F^7$ adjustably secured in the guideway $E^{12}$, so as to bring the can body A in proper relation to the pusher F'.

The can head A' is pushed down into position in the mouth of the can body A by the assembling device G, which is provided with a head G' secured on a stem $G^2$ mounted to slide up and down in a suitable bearing $N^{12}$ attached to the main frame N (see Figs. 1 and 2). The upper end of the stem $G^2$ is pivotally connected by a link $G^3$ with an arm $G^4$ (see Figs. 1 and 2) attached to a short shaft $G^5$ journaled in suitable bearings arranged on the main frame N, and on the said shaft is secured a rearwardly-extending arm $G^6$ carrying a friction roller $G^7$ engaging a cam groove $G^8$ formed in the face of a cam $G^9$ (see Fig. 25) secured on the cam shaft Q. Thus when the machine is running the cam $G^9$ and the mechanism just described impart an up and down intermittent sliding motion to the head G' so that the latter in its descent engages the top of the can head A' and forces the same firmly to its seat in the mouth of the can body A and at the time the can body is in a notch H' of a platen H but is still seated on the seat $E^{11}$. It is understood that the head G' moves downward and upward at the time the pusher $F^4$ recedes. It is understood that as the mouth of the can body A is restored to cylindrical shape by the device D, the can head A' now fits snugly into the mouth of the can body with the flange $A^3$ of the can head A' in firm contact with the flange $A^2$ of the can body A.

The can body A with the head A' pressed in position thereon is now carried by the platen H to the double-seaming device I, and for this purpose a rotary motion is given to the platen H by the following mechanism: The platen H is secured on a vertically-disposed shaft $H^2$ journaled in suitable bearings arranged on the main frame N (see Fig. 7), and on the upper end of the said shaft $H^2$ is secured a bevel gear wheel $H^3$ in mesh with a bevel pinion $H^4$ secured on the inner end of a horizontally-disposed shaft $H^5$ extending longitudinally and journaled in suitable bearings arranged on the top of the main frame N. On the left-hand end of the shaft $H^5$ is secured a slotted star wheel $H^6$ engaged by a detent wheel $H^7$ having a crank arm $H^8$ engaging the slots in the star wheel $H^6$ to periodically turn the star wheel $H^6$ when the machine is running and the wheel $H^7$ is rotated. The wheel $H^7$ and its crank arm H⁸ are secured on a shaft H⁹ journaled on the left-hand end of the main frame N, and on the said shaft H⁹ is secured a gear wheel H¹⁰ in mesh with the pinion Q² previously mentioned, so that when the machine is running a rotary motion is given to the shaft H⁹ and the wheel H⁷ secured thereon. The gearing is arranged in such a manner that the platen H makes one-eighth of a revolution for each revolution of the cam shaft Q driven from the pinion Q², as previously explained.

The filled can in the platen H is resting with its flange A² on top of the platen, the notches H′ of which are shaped to conform to the can body A, and the can while being carried from the receiving position at the front of the platen to the discharging position at the chute L is held against outward movement by a segmental side guard rail U supported by the frame N. The guard rail U is provided with a swing section U′ (see Fig. 6) opposite the double-seaming device I to permit of gaining access to the can at this device in case of accident. The swing section U′ is pivoted at U², and is provided at its free end with a notch U³ adapted to engage a bolt U⁴ held on the main frame to permit of securing the swing section U′ firmly in place while the machine is running.

In order to hold the can heads A′ down on the can bodies A to prevent spilling of the contents of the cans during their travel from the front to the double-seaming device I, use is made of a top guard rail U⁵ provided with upwardly-extending pins U⁶ fitted to slide in bearings U⁷ on the main frame N, and on the said pins are coiled springs U⁸ for pressing the top guard rail U⁵ downward into contact with the tops of the can heads A′. The top guard rail extends into segmental notches H¹² formed in the raised shoulders H¹³ rising on the top of the platen H and concentric with the notches H′, as plainly indicated in Figs. 6 and 8. A top guard rail R⁷ for the can head is secured to the table R (see Fig. 29) to engage the top of the can head A′ at the outer side thereof.

The double-seaming device I and the compressing device J are arranged as follows, special reference being had to Figs. 5, 6, 7, 9 and 10: The flange A³ of the can head A′ projects beyond the flange A² of the can body A (see Fig. 18) to permit of bending the projecting portion of the flange A³ around the flange A², as shown in Fig. 19, to form a double seam. This double-seaming or bending is accomplished by the use of one, two or more grooved and horizontally-disposed rollers I′ journaled on the lower ends of levers I² fulcrumed on a revoluble head I³, the said levers I² being provided at their upper ends with friction rollers I⁴ adapted to be pressed outward by a conical cam sleeve V to cause the levers I² to swing inward at their lower ends and thereby move the bending or crimping rollers I′ in contact with the flange A³ to bend the same around the flange A². It is understood that the revoluble head I³ carries the levers I² and their rollers I′ around the can while the latter is held stationary by being clamped between a clamping head W and a support X, of which the clamping head W engages the top of the can and the support X supports the can and raises the same for the time being a distance sufficient to elevate the rims A², A³, above the guard H¹² of the platen H (see Fig. 7) to allow the rollers I′ to engage and bend the flange A³ as previously explained. The revoluble head I³ is provided with a cylindrical rim I⁵ mounted to turn in a suitable bearing N¹⁴ arranged on the main frame N (see Figs. 9 and 10), and the hub I⁶ of the revoluble head I³ is provided at its upper end with a pinion I⁷ in mesh with a gear-wheel I⁸ attached to the upper end of a vertical shaft I⁹ journaled in suitable bearings arranged on the main frame N. On the lower end of the shaft I⁹ is secured a bevel gear wheel I¹⁰ in mesh with a pinion I¹¹ attached to the main shaft Q⁷ (see Fig. 7), so that when the machine is running a continuous rotary motion is given to the head I³ by the gearing just described. The revoluble head I³ is provided with a depending flange I¹² approximately semi-spherical, (see Figs. 7, 9 and 10) and cut out at portions for the passage of the levers I² and grooved rollers I′, and the said flange extends with its lower edge close to the top edge of the guard rail section U′ and the top of the segmental shoulders H¹³ of the platen to hold the can head A′ while the platen H carries the can to the double-seaming device and from under the rear end of the top guard rail U⁵. It will also be noticed that the clamping head W extends concentrically within the flange I¹² and when the can body and its head are raised on raising the support X then the flange I¹² guides the can head A′ and prevents it from being accidentally dislocated until the can head finally engages the head W. The conical cam sleeve V is mounted to slide up and down on the hub I⁶ of the revoluble head I³, and the said conical sleeve V is provided with a ring V′ having a slidable block V² pivotally connected with the forked end of a bell crank lever V³ (see Figs. 7, 9 and 10) fulcrumed on the main frame N, and provided with a friction roller V⁴ engaging a cam groove V⁵ formed in a cam V⁶ (see Fig. 22) secured on the cam shaft Q. Thus when the machine is running the cam V⁶ imparts an intermittent swinging motion to the bell crank lever V³ so that the latter intermittently raises and lowers the conical sleeve V for actuating the levers I² as previously explained. The clamping head W has its hub W' extending through the hub I⁶ of the revoluble head I³ and the upper end of the said hub W' terminates in a screw rod W² engaging a bracket N¹⁵ forming part of the main frame N, the screw rod W² being engaged by nuts W³ for securing the screw rod in position on the bracket N¹⁵ and allowing of adjusting the hub W' and its head W in a vertical direction to bring the head W in proper relation to the top of the can under treatment at the time in the double-seaming device I.

The support X is provided with a depending stem X' secured in a cross head X² provided with sliding blocks X³ pivotally connected with the forked end of a bell crank lever X⁴ fulcrumed on the main frame N (see Figs. 3 and 4), and pivotally connected by a link X⁵ with a lever X⁶ fulcrumed at X⁷ on the rear end of the main frame N, and on the upper end of the said lever X⁶ is arranged a friction roller X⁸ engaging a cam groove X⁹ formed in a cam X¹⁰ (Fig. 24) secured on the cam shaft Q. When the machine is running the cam X¹⁰ and the mechanism described causes an intermittent up and down movement of the cross head X² to raise and lower the support X for elevating the can body A for the double-seaming operation and to lower the can back to its original position on the platen H.

The compressing device J is provided with a grooved horizontally-disposed compressing roller J' adapted to engage a double seam to press the same with a view of rendering the can air-tight. The compressing roller J' is journaled on a bell crank lever J² fulcrumed on an adjustable bearing J³, held on the main frame N (see Figs. 5 and 6), and the said bell crank lever J² is pivotally connected by a sectional yielding link J⁴ with the lower end of a lever J⁵ fulcrumed at J⁶ on the main frame N (see Fig. 4). The upper end of the lever J⁵ is provided with a friction roller J⁷ engaging a cam groove J⁸, in a cam J⁹ (see Fig. 26) secured on the cam shaft Q. Thus when the machine is running and the cam shaft Q is rotating then a rocking motion is given by the mechanism described to the bell crank lever J² so as to move the compressing roller J' in firm engagement with the double seam of the can to compress the said seam as before explained. It is understood that the sectional and yielding link J⁴ allows the crimping roller J' to yield to any irregularity in the double seam during the compressing operation. The can during the compressing operation is turned and for this purpose is held between a clamping head W⁴ and a support X¹¹, of which the head W⁴ is mounted to rotate and is for this purpose provided on its hub W⁵ with a pinion W⁶ in mesh with a gear wheel I⁸ which also drives the revoluble head I³ as previously explained. The support X¹¹ is mounted to rotate and move up and down, and for this purpose the support X¹¹ is provided with a depending stem X¹² secured in a sleeve X¹³ mounted to rotate in suitable bearings on the cross head X² previously described, so that when the cross head is raised and lowered then the support X¹¹ moves up and down with the cross head the same as the support X. On the sleeve X¹³ is secured a pinion X¹⁴ in mesh with a gear wheel X¹⁵ secured on the shaft I⁹ previously described, so that when the said shaft is rotated a rotary motion is given to the pinion X¹⁴, sleeve X¹³, stem X¹² and support X¹¹ to rotate the latter in unison with the clamping head W⁴, which is also rotated from the shaft I⁹, as above explained.

In the hubs W' and W⁵ are mounted to slide vertically, pusher rods Y and Y' adapted to press with their lower ends the tops of the cans at the time the supports X and X¹¹ move downward, so that the cans are returned to their proper positions on the platen H. The lower ends of the pusher rods Y and Y' are preferably provided with heads Y² adapted to be seated in recesses in the under side of the heads W and W⁴, as indicated in Fig. 9, and the upper ends of the said pusher rods Y and Y' are provided with bars Y³ extending through elongated slots in the hubs W' and W⁵ to engage a cross head Y⁴ provided with sliding blocks Y⁵ pivotally connected with a bell crank lever Y⁶ fulcrumed on the main frame N, and provided with a friction roller Y⁷ engaging a cam groove Y⁸ formed in a cam Y⁹ (Fig. 23) secured on the cam shaft Q, so that when the machine is running the cam Y⁹ imparts a rocking motion to the lever Y⁶ to move the cross head Y⁴ up and down and with it the pusher rods Y and Y' for the purpose previously explained.

The ejecting device K for removing the finished can from the platen H is arranged as follows, special reference being had to Figs. 1, 4, 6 and 17: Two pusher arms K' and K² are arranged below and above the platen H so that the pusher arm K' engages the can body A while the pusher arm K² engages the double seam and moves through a notch H¹⁴ formed in the guard H¹³ of the platen H at each opening H'. The pushers K' and K² are mounted to slide in suitable guideways K³ held on the main frame N, and on the said pushers K' and K² are arranged sliding blocks K⁴ pivotally connected with arms K⁵, K⁶ secured on the rock shaft P and projecting transversely therefrom; so that when the rock shaft P is rocked, as previously explained, then a longitudinal sliding motion is intermittently given to the pushers K' and K² at the time the platen H is at a standstill, so that the pushers K' and K² in their inward movement toward the center of the platen H move to the rear of the corresponding notch H' empty at the time, and when the platen H is advanced to bring a completed can in alinement with the pushers K' and K² then the latter move outward and push the same off the platen H and onto the chute L, from which the filled cans are removed by an operator or by mechanical means, if desired.

In order to hold the platen H against accidental rotation and to bring the cans accurately into axial alinement with the double-seaming and compressing devices I and J, use is made of a locking device arranged as follows, special reference being had to Figs. 1, 3, 5 and 6: A locking bell crank lever Z is fulcrumed at Z' on the main frame N and is provided with a wedge-shaped tooth Z² adapted to engage correspondingly-shaped notches H¹⁵ formed in the peripheral face of the platen H between adjacent notches H'. The bell crank lever Z is pivotally connected by a transversely-extending link Z³ with the lower end of a lever Z⁴ fulcrumed on the rear of the main frame N, and provided at its upper end with a friction roller Z⁶ engaging a cam groove Z⁷ formed in a cam Z⁸ (see Fig. 20), secured on the cam shaft Q, so that when the machine is running the said cam Z⁸, lever Z⁴ and link Z³ will impart an intermittent swinging motion to the bell crank lever Z, so that the tooth Z² thereof engages a notch H¹⁵ at the time the platen H comes to a period of rest. Now by making the tooth Z² and the notches H¹⁵ wedge-shaped, it is evident that the slight irregularity in the movement of the platen H is rectified on the tooth Z² entering the corresponding notch H¹⁵ to bring the platen H to proper position while at rest and to hold the platen locked during the period of rest, that is, during the time a can is pushed into a notch H' at the front another can is double-seamed by the double-seaming device I, another can is compressed at the compressing device J, and another can is removed from the platen H by the ejecting device K.

The operation is as follows: The can bodies A filled with food products are placed by hand or otherwise on the conveyer belt B' of the conveyer B and are carried by the same rearwardly one behind the other until the forward can body reaches the plate N⁴ at the time the plunger C is in an outermost position, and then this can body is pushed by the plunger C over to the left onto the platform D' of the pressing and restoring device D, and while the can body A is on the platform D' the upper portion of the can body is externally engaged by the anvil dies D⁵, D⁶ and the conical head D⁷ to press the food product down in the can body and at the same time restore the distorted mouth of the can body to regular form, after which the dies D⁵, D⁶ open and the head D⁷ is lifted to permit the next following can to push the first can off the platform D' and over the table N³ onto the conveyer belt E' of the conveyer E which carries the can bodies from the right to the left. The foremost can body on the conveyer belt finally abuts against the stops F⁶ of the transverse shifting device F at the time the pushers F' and F⁴ are in an outermost position and at the time a can body A reaches the stops F⁶, the can head A' is fed from the left to the right along the guideway R³ into the guideway R⁴ directly above the said can body, and then the pushers F' and F⁴ move rearwardly, and in doing so the pusher F' pushes the can body A off the belt E' and onto the seat E¹¹, and at the same time the foremost can head A' is pushed by the pusher F⁴ into the rear end of the guideway R⁴ so that this can head A' drops down onto the top of the can body A seated on the seat E¹¹, as indicated in Fig. 7. This takes place at the time the head G' of the assembling device G is raised, and the said head G' now descends and firmly presses the can head A' in position on the can body A. The platen H now makes one-eighth of a revolution and carries this can body A with the can head thereon along until the next following notch H' moves in register with the seat E¹¹ and the assembling device. The above-described operation is continually repeated so that the platen H receives one can body with the head thereon one after the other, and the said cans are carried around by the platen until the can finally comes to rest in axial alinement with the double-seaming device I. The can body A at the double-seaming device I is now raised by the platform X, and then the double-seaming rollers I' act on the projecting portion of the flange A³ of the can head A' to bend this flange around the flange A² to form a double seam, and when this has been accomplished the rollers I' move outwardly out of engagement with the double seam and then the support X moves downward and with it the pusher rod Y so that the double-seamed can body is returned to its normal position in the platen H, which at the end of the next two-eighths revolution brings the double-seamed can body into position at the compressing device J, at which the double-seamed can body is raised by the platform X¹¹ and the roller J' compresses the double seam to render the same air-tight. When this has been done the support X¹¹ moves downward and with it the pusher rod Y' so that the finished can is moved down on the platen H to its former position. On the next one-eighth revolution of the platen H the finished can body is moved to the ejecting device K, and the pushers K′ and K² now engage the can body A and the can head A′ and push the same off the platen H onto the chute L, from which the finished can is removed by hand or by mechanical means. It is understood that as the pusher C acts synchronously with the transverse shifting device F for both the can body and can head, the can bodies arrive at the device F at the proper time, to be pushed transversely by the said shifting device. As the several devices with the exception of the belts B′ and E′ are actuated from the main driving shaft Q⁷, the several devices controlled from the said shaft operate in unison to produce the desired result.

From the foregoing, it will be seen that during the double-seaming operation, the can is held stationary and the rollers I′ are bodily carried around the can and gradually pressed inward to insure an accurate bending of the flange A³ around the flange A², and during the compressing operation the can is rotated and the compressing roller J′ is swung inward and pressed against the double seam of the revolving can, to compress the double seam to such an extent as to render the can air-tight without the use of solder.

Having thus described my invention, I claim as new and desire to secure by Letters Patent:

1. A machine of the class described, comprising the following instrumentalities in combination, a device for pressing the contents of a filled can body down into the same and restoring the distorted mouth of the said can body to regular form, a device for placing a can head on the pressed and restored can body, a device for double-seaming the flanges of the can body and can head, and a device independent of the double seaming device for compressing the double seam to render the same air-tight.

2. A machine of the class described, comprising a device for pressing the contents of a filled can body down into the same and restoring the distorted mouth of said can body to regular form, a device for placing a can head on the pressed and restored can body, an intermittently moving carrier for receiving the can body with its head, a device for double-seaming the flanges of the can body and head while held on the carrier, a device independent of the double-seaming device for compressing the double seam to render the same air-tight, and an ejecting device for removing the finished can from the said carrier.

3. A machine of the class described comprising an intermittently rotating platen for supporting a filled can body and can head held thereon, means for raising and lowering the can at the time the platen is at rest, means for holding the can against rotation while raised, said means including a head adapted to rest on the can head within the can body, revoluble double-seaming rollers revolving about the can body for bending the flange of the can head around the flange of the can body, means for raising the can a second time and rotating it, and a compressing device operating independently of the double seaming device for compressing the seam to render the same air-tight.

4. A machine of the class described, comprising a horizontally disposed intermittently rotating platen having peripheral notches to receive and support a can body by the flange of the can body resting on the platen, means for raising and lowering the can body and its head while the platen is at rest, means for holding the can body against rotation while raised, said means including a head adapted to rest upon the can head within the can body, double seaming grooved rollers revolving about the can body and engaging the flange of the can head and bending it around the flange of the can body to form a double seam while the can body and its head are raised and held against rotation, means for raising and lowering the can body a second time and rotating it, and a compressing device for compressing the double seam while the can body is raised and rotated and the platen is at rest, said compressing device operating independently of the double seaming device.

5. A machine of the class described, comprising a horizontally-disposed intermittently-rotating platen having notches at its peripheral face for receiving a can body and its can head held thereon, the flange of the can body resting on the said platen for the latter to support the can body and its head, means for raising and lowering the said can body and its head at the time the platen is at rest, means for holding the can body against rotation while raised, said means including a head adapted to rest on the can head within the can body, grooved rollers revolving about the can body and engaging the flange of the can head and bending the said can head flange around the flange of the said can body to form a double seam at the time the can is raised and held against rotation, means for raising the can a second time and rotating the said can while the platen is at rest, a compressing roller adapted to compress the said double seam at the time the can is raised and rotated and the platen is at rest, a swing arm in which the said roller is journaled, operating means, and a yielding connection between the operating means and swing arm.

6. A machine of the class described, comprising a horizontally-disposed intermittently-rotating platen having notches at its peripheral face for receiving a can body and its head held thereon, the flange of the can body resting on the said platen for the latter to support the can body and its head, means for raising and lowering the said can body and its head at the time the platen is at rest, means for holding the can body against rotation while raised, said means including a head adapted to rest on the can head within the can body, grooved rollers revolving about the can body and engaging the flange of the can head and bending the said can head flange around the flange of the said can body to form a double seam at the time the can is raised and held against rotation, means for raising the can a second time and rotating the said can while the platen is at rest, a compressing roller adapted to compress the said double seam at the time the can is raised and rotated and the platen is at rest, a swing arm in which the said roller is journaled, and an ejecting device having means to engage the can body and the compressed double seam for removing the finished can from the platen at the time the platen is at rest.

7. A machine of the class described, provided with an intermittently-revolving platen having means for supporting a filled can body and head held on the said body, the said platen having on its top raised segmental shoulders provided with notches, and a yieldingly-mounted top guard rail extending into the said notches and adapted to engage the tops of the can heads to hold the latter down onto the can bodies.

8. In a machine of the class described, the combination with an intermittently rotating platen having peripheral notches to receive can bodies, means for feeding can bodies and their heads to the platen, means for supporting a can body and holding it against rotation, and means for double seaming the can head on the can body while the platen is at rest and the can held against rotation, of a vertically slidable and revoluble support for a can below the platen, a revoluble clamping head above the platen, a pivoted bell crank lever adjacent to the platen, a compressing roller mounted in one member of the bell crank lever, a pivoted lever, a yielding link connecting the bell crank lever with said lever, and means for operating the last named lever.

9. A machine of the class described, comprising a pressing and shape-restoring device, means for feeding filled can bodies to the same, a conveyer onto which the pressed and restored can bodies are pushed by the next following can body, an intermittently rotating platen having notches to receive the can bodies, means for feeding can heads upon the can bodies, means for feeding the can bodies with their heads into the notches of the platen to be supported therein by their flanges, means for forcing the can head into the mouth of the can body, means for raising and lowering a can body and its head at the time the platen is at rest, means for holding the can against rotation while raised, a revoluble double-seaming device for bending the can head flange around the flange of the can body at the time it is raised and held against rotation to form a double-seam, means for raising the can a second time and rotating the same while the platen is at rest, means for compressing the double seam while the can is rotated, and means for ejecting the can from the platen.

10. A machine of the class described, comprising a pressing and shape-restoring device, means for feeding filled can bodies to the said device, an intermittently rotating platen having notches to receive the can bodies, means for feeding can heads upon the can bodies received from the pressing and shape restoring device, means for feeding the can bodies with their heads into the notches of the platen to be supported therein by their flanges, means for forcing the can head into the mouth of the can body, means for raising and lowering a can body and its head at the time the platen is at rest, means for holding the can against rotation while raised, revoluble double seaming rollers for bending the can head flange around the flange of the can body at the time it is raised and held against rotation to form a double seam, means for raising the can a second time and rotating it while the platen is at rest, a roller for compressing the double seam while the can is rotated, and means for ejecting the can from the platen.

11. In a machine of the class described, the combination of an intermittently revolving carrier having can receiving pockets, a double seaming device, a can support, dies for clamping a can held on said support, a reciprocating conical head adapted to enter the mouth of the can, to true up the same and compress the contents of the can and provided with an annular flange for engaging a previously formed flange on the can, and means for feeding the filled cans with their heads to the pockets of the carrier.

In testimony whereof I have signed my name to this specification in the presence of two subscribing witnesses.

HENRY L. GUENTHER.

Witnesses:
T. J. SPENCER,
E. S. BLAIN.